(No Model.)

G. P. FENNER.
EXPANSIBLE PISTON.

No. 430,517. Patented June 17, 1890.

WITNESSES:
Edward Wolff
William Miller

INVENTOR:
George P. Fenner
BY Van Santvoord & Hauff
ATTORNEYS

UNITED STATES PATENT OFFICE.

GEORGE P. FENNER, OF NEW LONDON, CONNECTICUT.

EXPANSIBLE PISTON.

SPECIFICATION forming part of Letters Patent No. 430,517, dated June 17, 1890.

Application filed April 3, 1890. Serial No. 346,436. (No model.)

*To all whom it may concern:*

Be it known that I, GEORGE P. FENNER, a citizen of the United States, residing at New London, in the county of New London and State of Connecticut, have invented new and useful Improvements in Expansible Pistons, of which the following is a specification.

This invention relates to an expansible or flexible piston; and the invention consists in the details of construction set forth in the following specification and claims, and illustrated in the accompanying drawings, in which—

Figure 1:
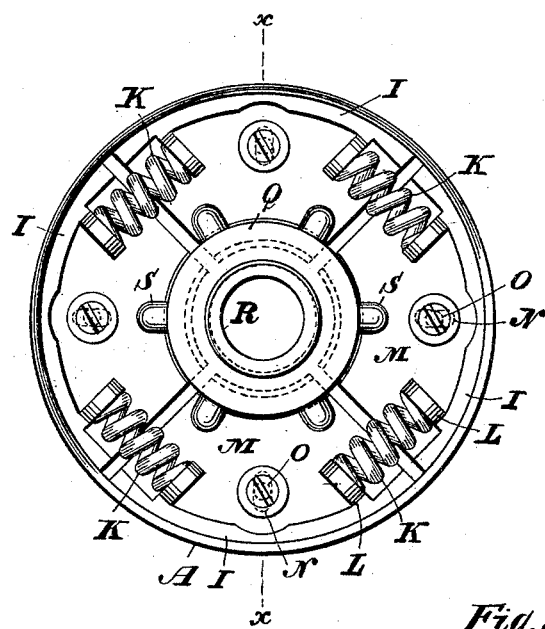
Figure 2:
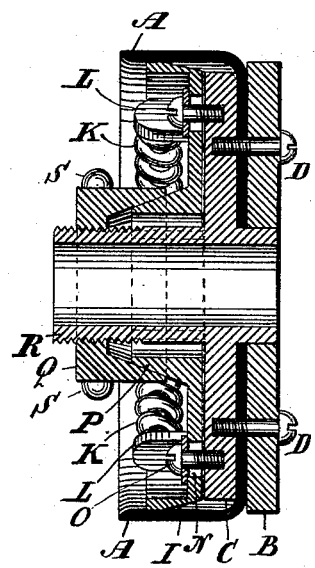
Figure 3:
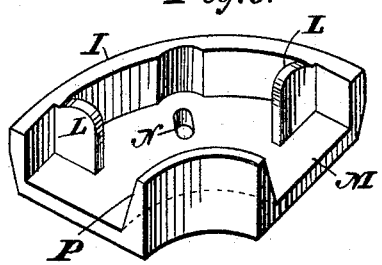

Figure 1 is a face view of the piston. Fig. 2 is a section along $xx$, Fig. 1. Fig. 3 is a detail perspective view of a rim-segment.

The flexible packing A is readily formed from a disk of leather, rubber, or other suitable material. The packing is clamped between the disks B C, and held together by screws or fastenings D. The packing A is expanded by the segmental rim I, so that the packing will snugly fit the cylinder. The rim I is shown in segments pressed apart by springs K. Each rim-segment has shoulders L, against which the springs are braced, and by interposing a spring between each two segments the segments will be continually expanded, so as to press against the packing. The base M of each rim-segment has a slot N for the reception of a screw O, which secures the segment to the disk C. The slot N allows the rim-segments to have a certain amount of play, so that the packing A can contract or be expanded, as required. The bases M are each provided with a shoulder P, which shoulders form a segmental hub, the exterior of which is tapering. This hub is engaged by a nut or screw Q, which overlays the tapering exterior of the hub and screws onto the thread part of the tube or lug R, rising from the disk C. The nut Q has lugs or finger-rests S, so that the nut can be readily rotated. When the nut Q is screwed toward the disk C, the rim I is contracted by having its various segments drawn inward by the nut. When the nut is screwed in the opposite direction, the rim I is free to be expanded by the springs K. The rim I and packing A can thus be adjusted to snugly fit the cylinder.

The disks B C are separable, so that when the packing A is worn out said packing can be readily removed from between the disks and a new packing put in place.

The nut overlapping the sectional tapering hub serves to contract the sectional rim against the tension of the springs, and the latter serve to expand the sectional rim when the nut is retracted, whereby the sectional rim can yield while in operation and accommodate the packing to the cylinder in which the piston works, thus enabling the piston to yieldingly fit the cylinder.

What I claim as new, and desire to secure by Letters Patent, is—

1. The combination of disks, a flexible packing clamped between the disks, a sectional rim movably secured to one of the disks, springs which act upon and expand the sectional rim, and a nut for contracting the sectional rim against the tension of the springs, substantially as described.

2. The combination of disks, a flexible packing clamped between the disks, a sectional rim movably secured to one of the disks and having a sectional hub the exterior of which is tapering, springs which act upon and expand the sectional rim, and a screw-nut overlaying the tapering exterior of the sectional hub and serving to contract the sectional rim against the tension of the springs, substantially as described.

In testimony whereof I have hereunto set my hand in the presence of two subscribing witnesses.

GEORGE P. FENNER.

Witnesses:
C. B. MAXSON,
NATHAN BABCOCK.